(12) United States Patent
Sakakibara et al.

(10) Patent No.: US 9,723,326 B2
(45) Date of Patent: Aug. 1, 2017

(54) IMAGE ENCODING METHOD AND IMAGE ENCODING APPARTAUS

(71) Applicant: Panasonic Intellectual Property Management Co., Ltd., Osaka (JP)

(72) Inventors: Kazuma Sakakibara, Osaka (JP); Kiyofumi Abe, Osaka (JP); Naoki Yoshimatsu, Aichi (JP); Hideyuki Ohgose, Osaka (JP); Koji Arimura, Osaka (JP); Hiroshi Arakawa, Nara (JP); Kazuhito Kimura, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 150 days.

(21) Appl. No.: 14/619,993

(22) Filed: Feb. 11, 2015

(65) Prior Publication Data
US 2015/0271485 A1    Sep. 24, 2015

(30) Foreign Application Priority Data

Mar. 20, 2014 (JP) ................................ 2014-058306

(51) Int. Cl.
*H04N 19/61* (2014.01)
*H04N 19/593* (2014.01)

(52) U.S. Cl.
CPC .................................. *H04N 19/593* (2014.11)

(58) Field of Classification Search
CPC .......... A61L 15/24; C08L 23/12; C08L 53/00; B29D 7/01; B29K 2023/12; B32B 27/32;
(Continued)

(56) References Cited

U.S. PATENT DOCUMENTS 8,059,717 B2    11/2011  Saigo et al.
8,923,395 B2 *  12/2014  Wang .................. H04N 19/176
                                                              375/240.01
(Continued)

FOREIGN PATENT DOCUMENTS

JP    2005-130509 A    5/2005
JP    2007-124409 A    5/2007
(Continued)

OTHER PUBLICATIONS

Wu et al, A Fast CU Encoding Scheme Based on the Joint Constraint of Best and Second-best PU Modes for HEVC Inter Coding, 2015.*
(Continued)

*Primary Examiner* — Shan Elahi
(74) *Attorney, Agent, or Firm* — Wenderoth, Lind & Ponack, L.L.P.

(57) ABSTRACT

An image encoding method includes: selecting, for each processing block, one of intra prediction modes specified by a coding standard, and performing intra prediction according to the intra prediction mode, wherein the intra prediction modes include a lower-left reference mode in which a processing block located at lower left of a current processing block is referred to, the processing blocks include a first processing block and a second processing block located at upper right of the first processing block, the second processing block being equal in size to the first processing block, the coding standard defines that information on the second processing block is written into a bitstream after information on the first processing block, and in the intra prediction, (i) selection of the lower-left reference mode is prohibited and intra prediction is performed on the second processing block, and, (ii) intra prediction is performed on the first processing block.

7 Claims, 14 Drawing Sheets

(58) Field of Classification Search
CPC ..... C08J 2323/10; C08J 5/18; Y10S 602/904; Y10T 428/31913; H04N 19/593
USPC .................................................. 375/240.03
See application file for complete search history.

(56) References Cited

U.S. PATENT DOCUMENTS

| | | | |
|---|---|---|---|
| 2005/0089094 A1 | 4/2005 | Yoo et al. | |
| 2005/0147165 A1* | 7/2005 | Yoo | H04N 19/105 375/240.14 |
| 2006/0008006 A1* | 1/2006 | Cha | H04N 19/176 375/240.16 |
| 2006/0018385 A1* | 1/2006 | Lee | H04N 19/176 375/240.24 |
| 2006/0072676 A1* | 4/2006 | Gomila | H04N 19/61 375/240.27 |
| 2007/0098070 A1 | 5/2007 | Saigto et al. | |
| 2008/0123750 A1* | 5/2008 | Bronstein | H04N 19/17 375/240.24 |
| 2009/0103620 A1* | 4/2009 | Lee | H04N 19/159 375/240.16 |
| 2011/0150078 A1* | 6/2011 | Reznik | G06F 17/147 375/240.03 |
| 2012/0008683 A1* | 1/2012 | Karczewicz | H04N 19/159 375/240.12 |
| 2012/0014436 A1* | 1/2012 | Segall | H04N 7/26755 375/240.12 |
| 2012/0128069 A1 | 5/2012 | Sato | |
| 2012/0170649 A1* | 7/2012 | Chen | H04N 19/159 375/240.12 |
| 2013/0003824 A1* | 1/2013 | Guo | H04N 19/176 375/240.03 |
| 2013/0114732 A1* | 5/2013 | Dong | G06F 17/147 375/240.19 |
| 2013/0322545 A1* | 12/2013 | Kondow | H04N 19/00587 375/240.16 |
| 2014/0072036 A1* | 3/2014 | Hellman | H04N 19/176 375/240.03 |
| 2014/0169458 A1* | 6/2014 | Yu | H04N 19/463 375/240.12 |
| 2014/0226719 A1* | 8/2014 | Yamamoto | H04N 19/0006 375/240.12 |
| 2014/0348233 A1* | 11/2014 | Kondo | H04N 19/119 375/240.12 |
| 2015/0049804 A1* | 2/2015 | Shimada | H04N 19/593 375/240.03 |
| 2015/0181208 A1* | 6/2015 | Park | H04N 19/00206 375/240.02 |

FOREIGN PATENT DOCUMENTS

| | | |
|---|---|---|
| JP | 2008-306413 A | 12/2008 |
| JP | 2011-041037 A | 2/2011 |
| JP | 2011-142699 A | 7/2011 |
| JP | 2012-191295 A | 10/2012 |

OTHER PUBLICATIONS

Paul et al, Performance Improvement of HEVC Using Adaptive Quantization, 2014.*
Lainema et al, Intra Coding of the HEVC Standard, Dec. 12, 2012.*
J. Lainema, et al., "Intra Coding of the HEVC Standard," IEEE Transaction on Circuits and Systems for Video Technology, IEEE, Dec. 2012, vol. 22, No. 12, pp. 1792-1801.

* cited by examiner

FIG. 11

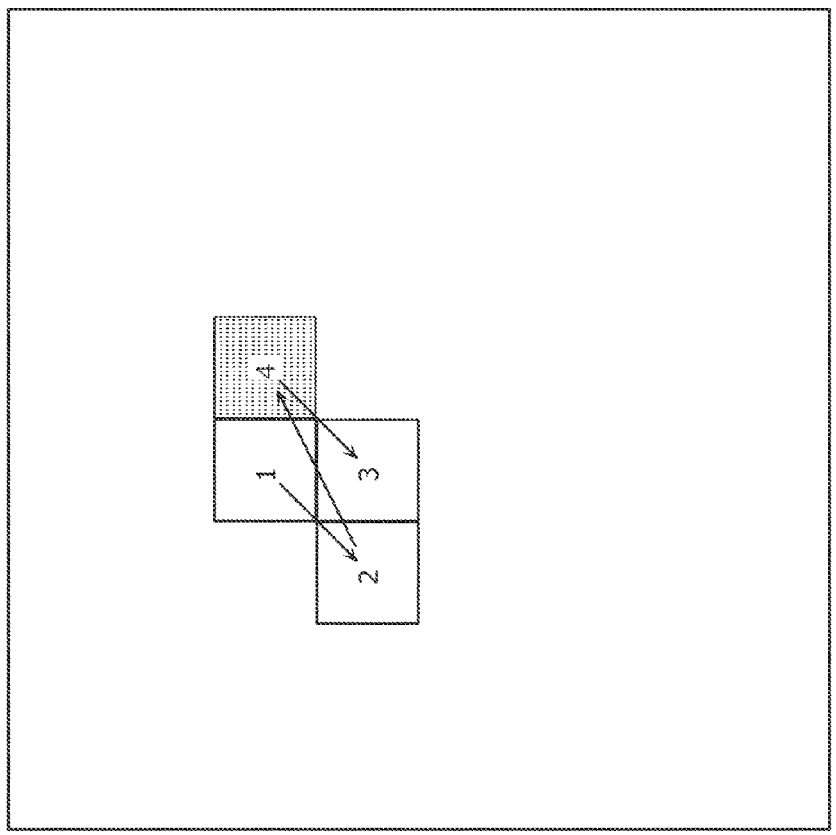

IMAGE ENCODING METHOD AND IMAGE ENCODING APPARTAUS

CROSS REFERENCE TO RELATED APPLICATION

The present application is based on and claims priority of Japanese Patent Application No. 2014-058306 filed on Mar. 20, 2014. The entire disclosure of the above-identified application, including the specification, drawings and claims is incorporated herein by reference in its entirety.

FIELD

The present disclosure relates to an image encoding method and an image encoding apparatus for performing intra prediction.

BACKGROUND

The MPEG-4 AVC/H.264 method (hereinafter referred to as the H.264 method) is known as a video coding standard. In such a video coding standard, one of intra prediction modes is selected and performed (for example, see Patent Literatures 1 to 3).

The high efficiency video coding (HEVC) has currently being considered as a next-generation video coding standard next to H.264.

CITATION LIST

Patent Literature

[PTL 1]
Japanese Unexamined Patent Application Publication No. 2005-130509
[PTL 2]
Japanese Unexamined Patent Application Publication No. 2011-41037
[PTL 3]
Japanese Unexamined Patent Application Publication No. 2011-142699

SUMMARY

Technical Problem

Image encoding methods for accelerating encoding processes have been desired.

The present disclosure provides an image encoding method and an image encoding apparatus for accelerating encoding processes.

Solution to Problem

An image encoding method according to the present disclosure includes: dividing each of coding unit blocks into a plurality of processing blocks which are processing units for intra prediction, each of the coding unit blocks being obtained by dividing a current picture to be encoded; and selecting, for each of the plurality of processing blocks, one of intra prediction modes specified by a predetermined coding standard, and performing intra prediction according to the selected intra prediction mode, wherein the intra prediction modes include a lower-left reference mode in which a processing block located at lower left of a current processing block to be processed is referred to, the plurality of processing blocks include a first processing block and a second processing block located at upper right of the first processing block, the second processing block being equal in size to the first processing block, the predetermined coding standard defines that information on the second processing block is written into a bitstream after information on the first processing block, and in the intra prediction, (i) selection of the lower-left reference mode is prohibited and intra prediction is performed on the second processing block, and subsequently, (ii) intra prediction is performed on the first processing block.

Advantageous Effects

The image encoding method and the image encoding apparatus in the present disclosure can accelerate encoding processes.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 11 is a diagram illustrating another example of a processing order in intra prediction according to the embodiment.

FIG. 14 is a diagram illustrating an outline of a processing order in intra prediction according to the embodiment.

DESCRIPTION OF EMBODIMENT

Figure 1:
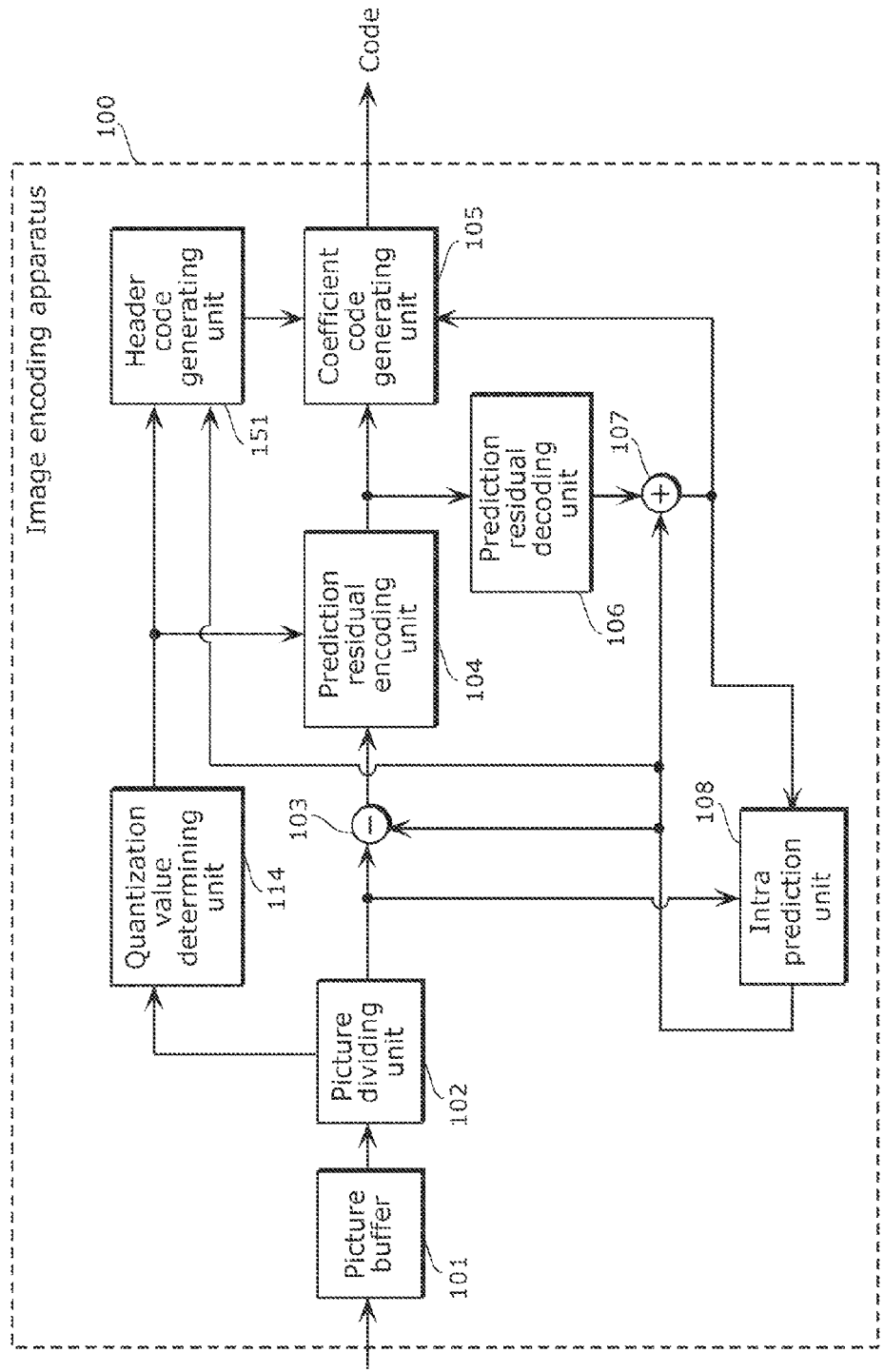
FIG. 1 is a block diagram illustrating a configuration of an image encoding apparatus according to an embodiment.

Hereinafter, an embodiment is described in detail referring to the drawings as necessary. It should be noted that unnecessarily detailed descriptions may be omitted below. For example, detailed descriptions about already well-known matters and overlapping descriptions for substantially identical configurations may be omitted. Such descriptions are omitted to prevent the descriptions below from being unnecessarily redundant and help a person skilled in the art to understand the present disclosure easily.

It should be noted that the inventors provide the attached drawings and descriptions below to allow the person skilled in the art to fully understand the present disclosure, and do not intend to restrict the subject matters of the Claims by the disclosure thereof.

Hereinafter, an embodiment is described with reference to FIGS. 1 to 14. To simplify explanation, operations of encoding according to HEVC is described.

[Configuration of Image Encoding Apparatus]

FIG. 1 is a block diagram of an image encoding apparatus 100 according to this embodiment.

The image encoding apparatus 100 divides a video input on a per picture basis into coding unit blocks (coding units: CUs), and performs CU-based encoding to generate a code. Each CU includes a plurality of sub-blocks. Each of constituent elements of the image encoding apparatus 100 performs processing on a CU or sub-block basis.

The image encoding apparatus 100 illustrated in FIG. 1 includes a picture buffer 101, a picture dividing unit 102, a subtractor 103, a prediction residual encoding unit 104, a coefficient code generating unit 105, a prediction residual decoding unit 106, an adder 107, an intra prediction unit 108, a quantization value determining unit 114, and a header code generating unit 115.

The image encoding apparatus 100 performs compression coding on an input image based on the HEVC standard to generate a code, and outputs the generated code.

The picture buffer 101 obtains the input image, and temporarily stores it onto a recording medium. For example, the picture buffer 101 rearranges the input image input on a picture basis in display order, according to an encoding order when storing the pictures. Any recording medium for storing the input image, such as a dynamic random access memory (DRAM) may be used as a recording medium in the picture buffer 101.

The picture dividing unit 102 is an example of a dividing unit for dividing a current picture to be encoded into a plurality of coding unit blocks (CUs), and further dividing each of the resulting coding unit blocks into a plurality of processing blocks which are processing units used for intra prediction (prediction units: PUs). When the picture dividing unit 102 receives a read instruction from the subtractor 103 or the quantization value determining unit 114, the picture dividing unit 102 obtains the input image from the picture buffer 101. Next, the picture dividing unit 102 outputs an image signal corresponding to the read instruction to the subtractor 103.

It is to be noted that the block sizes of each CU and PU can be set at any time before processing is performed using the CU and PU. The block size of a PU may be set after the block size of a CU is set. The block size of a CU may be set after the block size of a PU is set. The block sizes of a CU and a PU may be set at the same time.

A CU is an example of a coding unit block, and is for example a block of 64×64 pixels, 32×32 pixels, 16×16 pixels, or 8×8 pixels.

The subtractor 103 calculates the difference between at least one CU (hereinafter referred to as a target CU) which is a processing target to be output from the picture dividing unit 102 and a prediction image to be output from the intra prediction unit 108, to generate a residual signal. For example, the subtractor 103 calculates a difference on a per CU or sub-block basis. The subtractor 103 outputs the residual signal to the prediction residual encoding unit 104.

The prediction residual encoding unit 104 performs orthogonal transform on the residual signal output from the subtractor 103 to generate an orthogonal transform coefficient. The prediction residual encoding unit 104 performs the orthogonal transform on the residual signal on a basis of a sub-block for orthogonal transform. Here, the sub-block for orthogonal transform is an orthogonal transform processing unit including a plurality of pixels, called a transform unit (TU). For example, the sub-block for orthogonal transform (TU) is a block of 32×32 pixels, 16×16 pixels, 8×8 pixels, or 4×4 pixels. The block size of a TU varies depending on whether an input signal is a luminance signal or a chrominance signal.

The prediction residual encoding unit 104 quantizes each of frequency components of resulting orthogonal transform coefficients to generate a quantization coefficient. Next, the prediction residual encoding unit 104 outputs the quantization coefficient to the coefficient code generating unit 105 and the prediction residual decoding unit 106. The prediction residual encoding unit 104 quantizes the orthogonal transform coefficient using a quantization value determined by the quantization value determining unit 114.

The coefficient code generating unit 105 performs variable length coding on the quantization coefficient output from the prediction residual encoding unit 104. The coefficient code generating unit 105 writes the code generated through variable length coding, next to the code generated by the header code generating unit 115. In this way, the coefficient code generating unit 105 generates a code signal to be output.

The prediction residual decoding unit 106 performs inverse quantization and inverse orthogonal transform on the quantization coefficient output from the prediction residual encoding unit 104 to reconstruct a decoded residual signal. The prediction residual decoding unit 106 outputs the resulting decoded residual signal to the adder 107.

The adder 107 adds the decoded residual signal output from the prediction residual decoding unit 106 and a prediction image to be output from the intra prediction unit 108 to generate a reconstructed image signal. Next, the adder 107 outputs the reconstructed image signal to the intra prediction unit 108.

The intra prediction unit 108 generates a prediction image corresponding to a block to be output from the picture dividing unit 102, based on the reconstructed image signal output from at least the adder 107. The intra prediction unit 108 uses intra prediction to generate a prediction image.

The intra prediction unit 108 generates a prediction image on a per sub-block for prediction basis. Here, a sub-block for prediction is a prediction processing unit including a plurality of pixels, called a prediction unit (PU). For example, the sub-block for prediction (PU) is an area that corresponds to a coding unit block output by the picture dividing unit 102 or is generated by dividing the coding unit block. For example, a PU is a block of 64×64 pixels, 32×32 pixels, 16×16 pixels, 8×8 pixels, or 4×4 pixels. Here, the size of a PU is determined based on the size of a CU. Specifically, a PU is equal in size to a CU, or is half of the length of one side.

The intra prediction unit 108 generates a prediction image of a target CU on a per PU basis, using pixel data of pixels included in already encoded CUs around the target CU. More specifically, the intra prediction unit 108 performs intra prediction based on the already encoded pixel data neighbouring the target CU to generate a prediction image.

The intra prediction unit 108 selects one of thirty five intra prediction modes conforming to the HEVC that is a coding standard supported by the image encoding apparatus 100. Furthermore, the intra prediction unit 108 performs intra prediction based on the selected intra prediction mode to generate a prediction image of a target PU. The intra prediction unit 108 outputs a prediction image of a block to be output by the picture dividing unit 102 to the subtractor 103 and the adder 107 on a TU basis. The prediction image of the block is obtained as a result of generating a prediction image on a PU basis.

Operations by the intra prediction unit 108 are explained in detail later.

The quantization value determining unit 114 sets a quantization value (a quantization width) to be used to quantize a residual signal in the prediction residual encoding unit 104, based on a picture to be stored in the picture dividing unit 102. The quantization value determining unit 114 outputs the set quantization value to the prediction residual encoding unit 104 and the header code generating unit 115. The quantization value determining unit 114 may use a method for setting a quantization value based on rate control. The rate control is performed to approximate a bit rate of an encoded signal to a target bitrate.

The header code generating unit 115 performs variable length coding on prediction information output by the intra prediction unit 108, a quantization value output by the quantization value determining unit 114, and control information related to other coding control, to generate codes. The prediction information includes, for example, information indicating an intra prediction mode, an inter prediction mode, a motion vector, and a reference picture. In addition, the control information is obtainable before processing in the coefficient code generating unit 105, and indicates a coding condition applied in the encoding of a block. For example, control information includes a picture encoding type or block division information. For example, a picture encoding type is information indicating an I-picture, a P-picture, or a B-picture, or information related to a prediction method applied to a block. The block division information includes division information on a sub-block in orthogonal transform or division information on a sub-block in intra prediction unit 108.

[Image Encoding Process]

Next, a description is given of a flow of image encoding processes performed by the image encoding apparatus 100.

Figure 2:
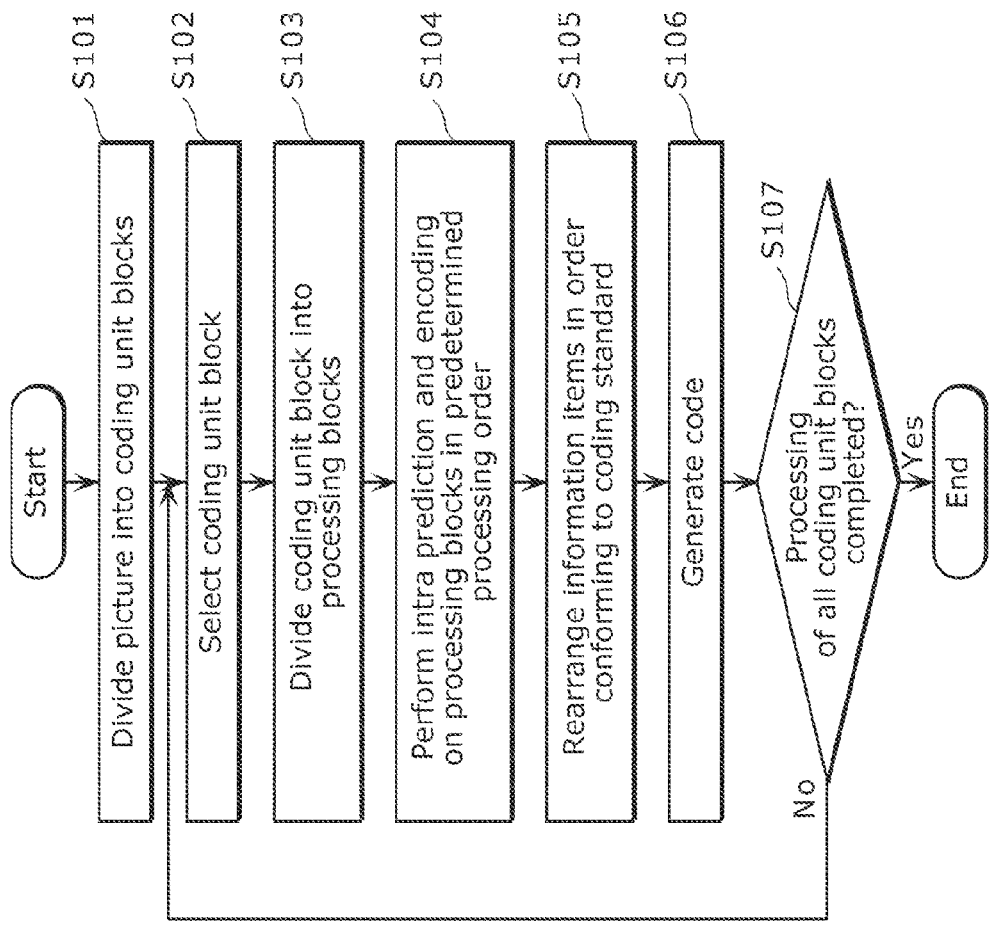
FIG. 2 is a flowchart of image encoding processes according to the embodiment.

FIG. 2 is a flowchart of the image encoding processes performed by the image encoding apparatus 100.

As described above, the picture dividing unit 102 divides a picture to be processed into a plurality of CUs (coding unit blocks) (S101). Next, at least one target CU to be processed among the plurality of CUs is selected and forwarded to the subtractor 103 (S102). At this time, depending on the size of a PU and the number of selected CUs, the processing order is updated to an order different from an order of writing onto a bitstream determined by the HEVC standard.

Figure 3:
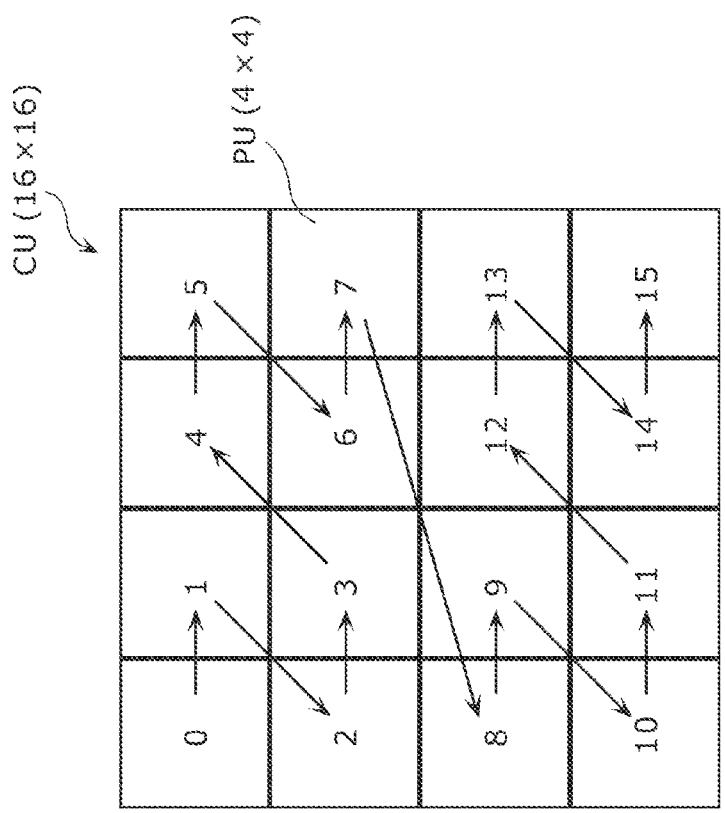
FIG. 3 is a diagram illustrating a writing order onto a bitstream conforming to the HEVC standard.
Figure 4:
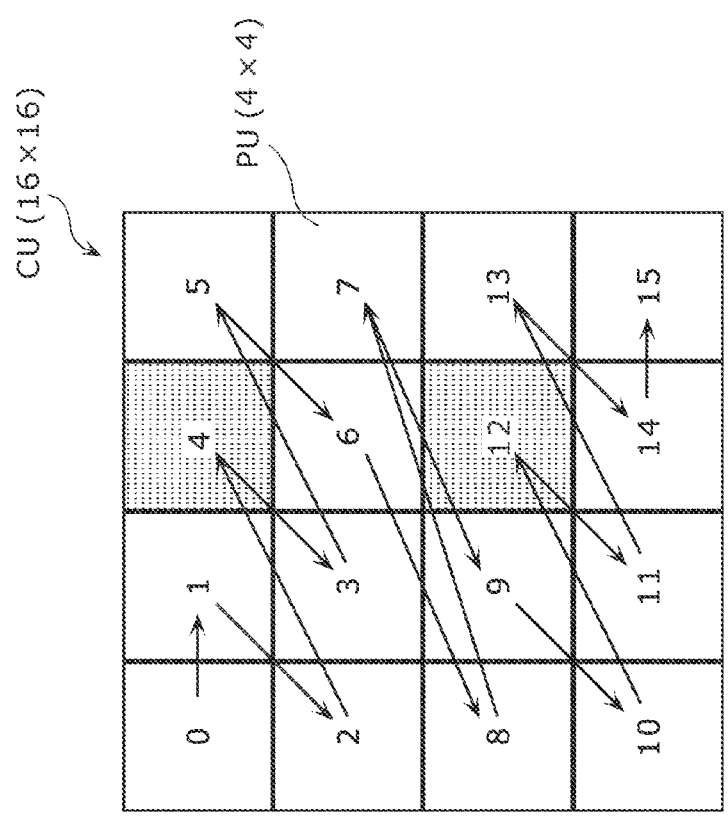
FIG. 4 is a diagram illustrating a processing order of intra prediction according to the embodiment.

FIG. 3 is a diagram illustrating an order of writing onto a bitstream determined by the HEVC standard. In addition, FIG. 4 is a diagram illustrating a processing order in intra prediction according to this embodiment. In a case given here, a CU includes 8×8 pixels, and a PU includes 4×4 pixels. In other words, neighboring four CUs include sixteen PUs. The numerical references provided to each PU in FIG. 4 indicate a writing order in the HEVC standard illustrated in FIG. 3.

As illustrated in FIG. 4, the image encoding apparatus 100 updates the processing order to an order different from the writing order defined by the HEVC standard. More specifically, the processing order illustrated in FIG. 4 is different from the writing order illustrated in FIG. 3, between Block 3 and Block 4, Block 7 and Block 8, and Block 11 and Block 12.

First, the picture dividing unit 102 divides a target CU into a plurality of PUs (processing blocks) (S103). Next, the intra prediction unit 108 performs intra prediction and encoding on the plurality of PUs in a predetermined processing order (S104). In this way, a plurality of prediction images corresponding to the plurality of PUs are sequentially generated. In addition, quantization coefficients and a reconstructed image signal corresponding to each PU are generated.

Figure 5:
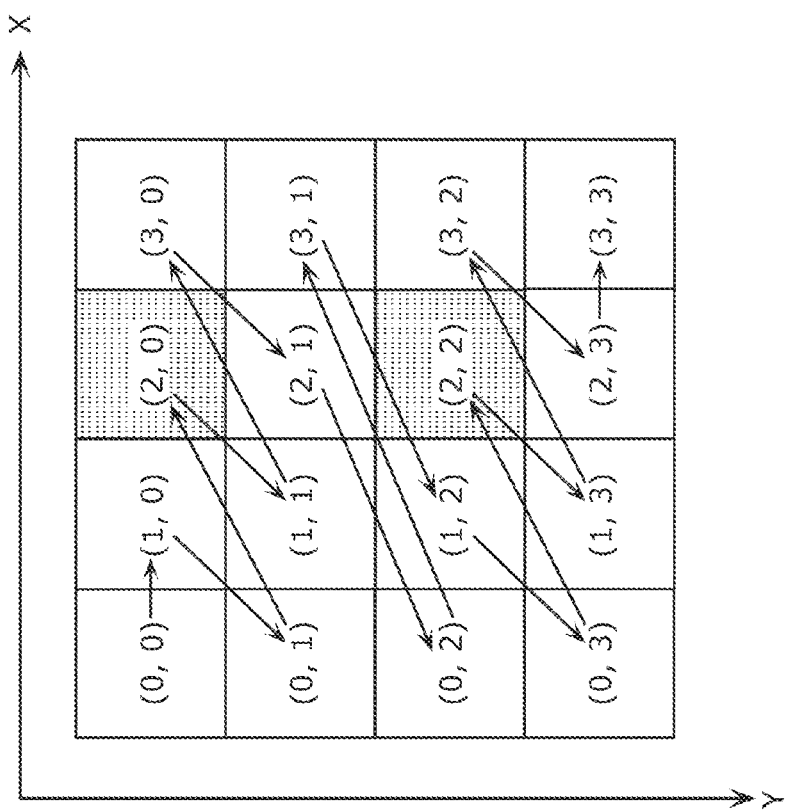
FIG. 5 is a diagram illustrating a processing order of intra prediction according to the embodiment.

For example, as illustrated in FIG. 5, when X denotes a horizontal axis position and Y denotes a vertical axis position with respect to a PU located at an upper-left most one of the PUs in a current CU, the location of each of the PUs is represented as (X, Y){X, Y=0, 1, 2, 3}. In this case, the intra prediction unit 108 performs intra prediction on the PUs in the following listed order: (0, 0), (1, 0), (0, 1), (2, 0), (1, 1), (3, 0), (2, 1), (0, 2), (3, 1), (1, 2), (0, 3), (2, 2), (1, 3), (3, 2), (2, 3), and (3, 3).

In addition, the PU located at (2, 0) and (2, 2) is a lower-left reference prohibition block, and a selection of an intra prediction mode in which pixel data of a lower-left PU is prohibited for the lower-left reference prohibition block. This processing is described in detail later.

Next, the coefficient code generating unit 105 rearranges quantization coefficients generated in an order different from the order (illustrated in FIG. 3) defined by the HEVC standard, in an order defined by the HEVC standard. In addition, the header code generating unit 115 rearranges information items related to intra prediction of the respective PUs output from the intra prediction unit 108, in an order defined by the HEVC standard (S105). Here, information related to intra prediction is, for example, information indicating a selected intra prediction mode.

Through the rearrangement, the code output from the image encoding apparatus 100 is a signal conforming to the HEVC standard, and can be correctly decoded by an image decoding apparatus conforming to the HEVC standard.

Next, the header code generating unit 115 performs variable length coding on the information items related to intra prediction in the rearrangement order. The coefficient code generating unit 105 performs variable length coding on quantized coefficients in the rearrangement order to generate a code (S106).

In this way, encoding on a single CU is completed. In addition, the image encoding apparatus 100 performs the sequence of processes on all of the CUs (S107).

[Intra Prediction]

Hereinafter, intra prediction (S104 in FIG. 2) performed by the intra prediction unit 108 is described in detail.

Figure 6:
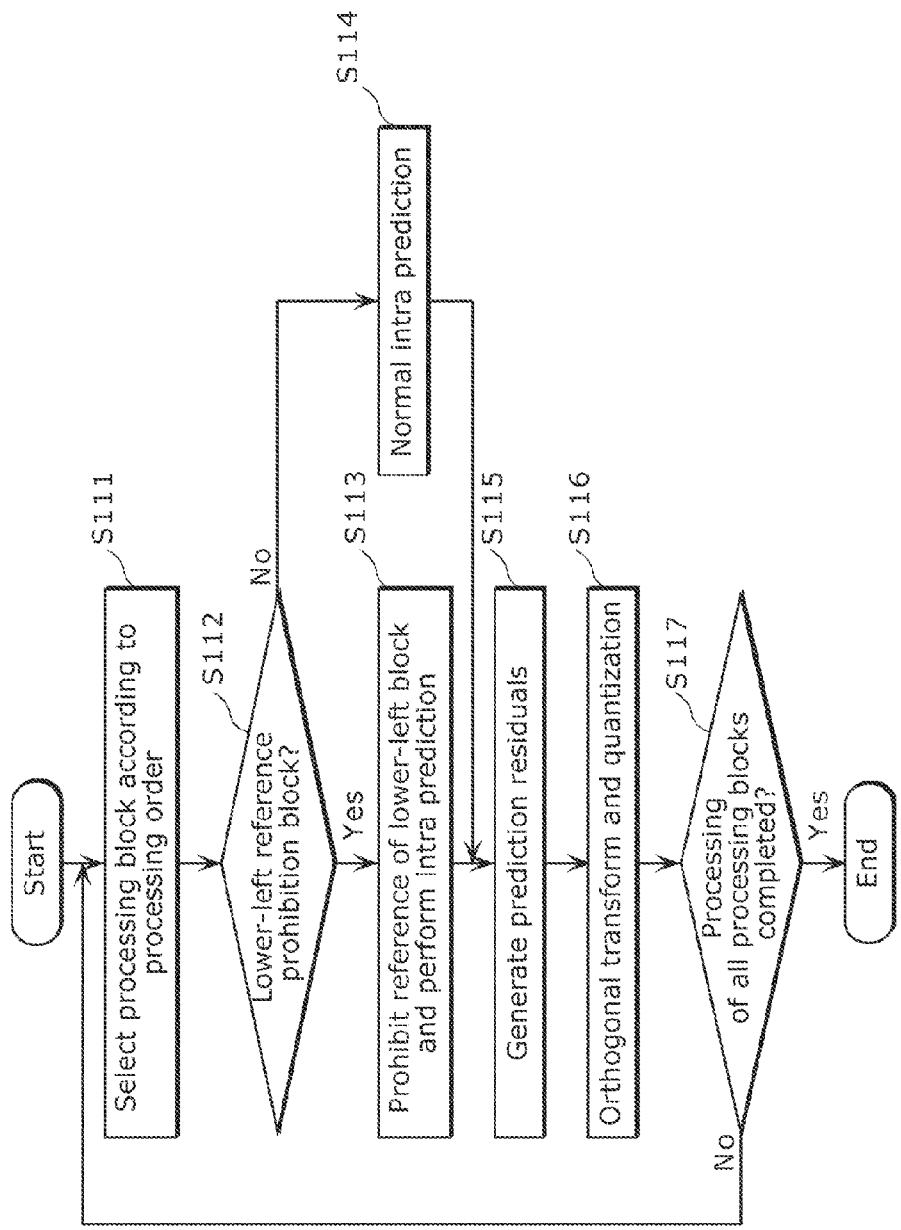
FIG. 6 is a flowchart of intra prediction processes according to the embodiment.

FIG. 6 is a flowchart of intra prediction performed by the intra prediction unit 108.

First, the intra prediction unit 108 selects a target PU from a plurality of PUs and performs the subsequent processes on a per PU basis, according to the processing order illustrated in FIG. 5 (S111).

First, the intra prediction unit 108 determines whether or not a target PU is one of lower-left reference prohibition blocks (PUs located at (2, 0) and (2, 2) in FIG. 5) (S112).

When the target PU is a lower-left reference prohibition block (Yes in S112), the intra prediction unit 108 prohibits selection of an intra prediction mode in which a PU located at lower left of a target PU among the thirty five kinds of intra prediction modes defined by the HEVC standard is prohibited and performs intra prediction on the target PU (S113).

Here, when the lower-left reference prohibition block is processed in writing order as a bitstream defined by the HEVC standard, (i) the PU located at lower left of the lower-left reference prohibition block has been already encoded, and (ii) the lower-left reference prohibition block is a PU for which the lower-left PU can be referred to. However, in the processing order illustrated in FIG. 5, the PU located at the lower left of the lower-left reference prohibition block has not yet been encoded. Thus, the intra prediction unit 108 prohibits reference of the lower-left PU for such a PU.

Figure 7:
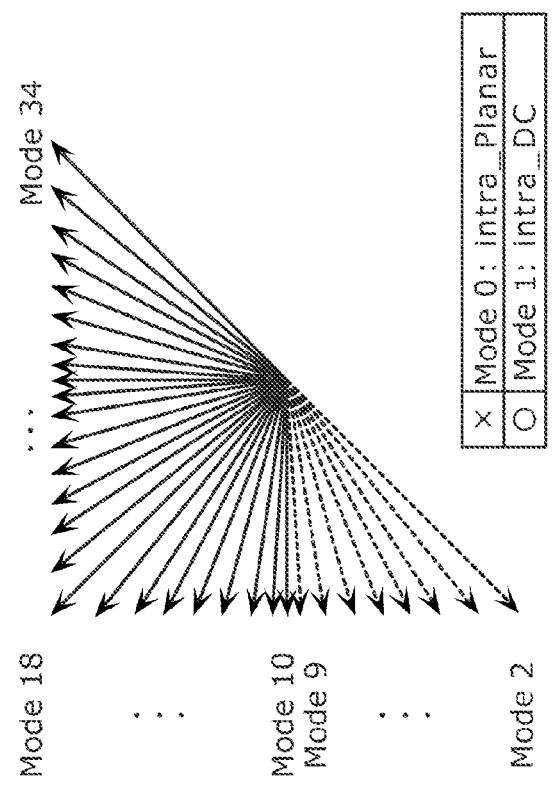
FIG. 7 is a diagram illustrating an intra prediction mode that is prohibited at a lower-left reference prohibition block according to the embodiment.

FIG. 7 is a diagram illustrating thirty five kinds of intra prediction modes (Mode 0 to Mode 34) defined by the HEVC standard. As illustrated in FIG. 7, the HEVC standard defines Planar prediction mode, DC prediction mode, and thirty three prediction direction modes.

The intra prediction unit 108 prohibits an intra prediction mode in which a lower-left PU is referred to from among thirty five kinds of intra prediction modes, for the lower-left reference prohibition block. More specifically, the intra prediction mode in which the lower-left PU is referred to is Mode 0 (Planar prediction mode) and Modes 2 to 9.

Figure 8:
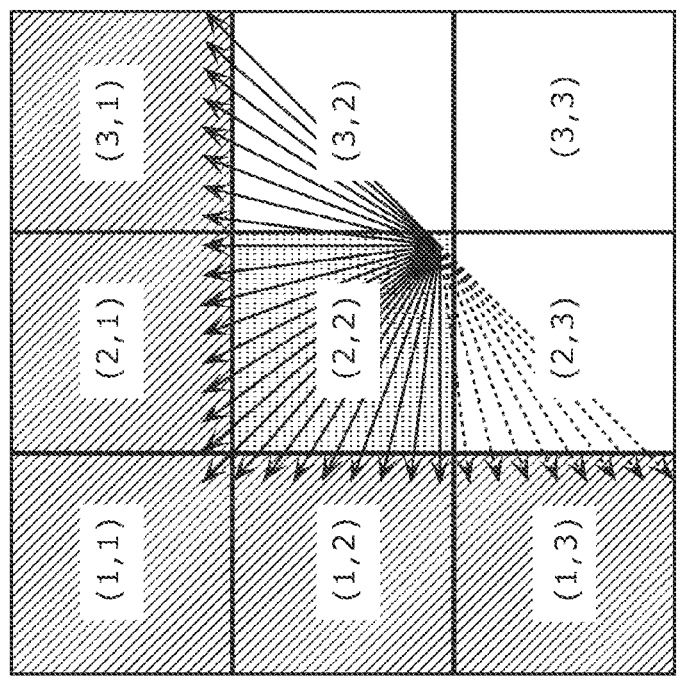
FIG. 8 is a diagram illustrating peripheral pixels which are referred to from the lower-left reference prohibition block according to the embodiment.

FIG. 8 is a diagram illustrating the lower-left reference prohibition block (2, 2) illustrated in FIG. 5 and neighboring blocks. As illustrated in FIG. 8, by prohibiting Modes 2 to 9, it is possible to prohibit that the lower-left block (1, 3) is referred to in the intra prediction of the lower-left reference prohibition block (2, 2).

Figure 9:
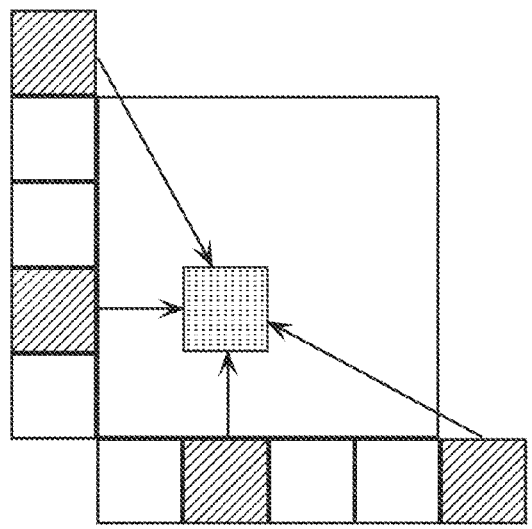
FIG. 9 is a diagram for illustrating Planar prediction mode according to the embodiment.

FIG. 9 is a diagram for illustrating Planar prediction mode (Mode 0). As illustrated in FIG. 9, in Planar prediction mode, the intra prediction unit 108 calculates a prediction value of a target pixel by calculating a weighted average of four reference pixels respectively included in the PUs located at upper, left, lower left, and upper right of the target PU. In this way, the lower-left PU is referred to also in Planar prediction mode, the intra prediction unit 108 prohibits Planar prediction mode for the lower-left reference prohibition block.

Returning to the flowchart of FIG. 6, a description is given below.

When a target PU is not a lower-left reference prohibition block (No in S112), the intra prediction unit 108 performs normal intra prediction. In other words, the intra prediction unit 108 selects one of the thirty five kinds of intra prediction modes defined by the HEVC standard, and performs intra prediction on the target PU (S114).

After Step S113 or S114, the subtractor 103 generates residual signals that are the differences between the target PU and the prediction image (S115). Next, the prediction residual encoding unit 104 performs orthogonal transform and quantization on the residual signals to generate quantized coefficients (S116). In addition, the prediction residual decoding unit 106 performs inverse quantization and inverse orthogonal transform on the quantization coefficients to generate residual decoded signals. Next, the adder 107 adds the decoded residual signals and the prediction image to generate a reconstructed image signal. This reconstructed image signal is used to perform intra prediction on the succeeding PUs.

In this way, intra prediction on the single PU is completed. The intra prediction unit 108 repeats the sequence of processes on all of the PUs (S117).

[Effects of the Present Disclosure]

As described above, the image encoding apparatus 100 performs intra prediction in the order illustrated in FIG. 5. Here, the HEVC standard defines an intra prediction mode in which a lower-left PU that is not defined by H.264 is referred to. For this reason, the coding efficiency can be increased by completing intra prediction of the lower-left PU before starting intra prediction of the target PU. Based on this idea, the writing order illustrated in FIG. 3 is defined.

Figure 10:
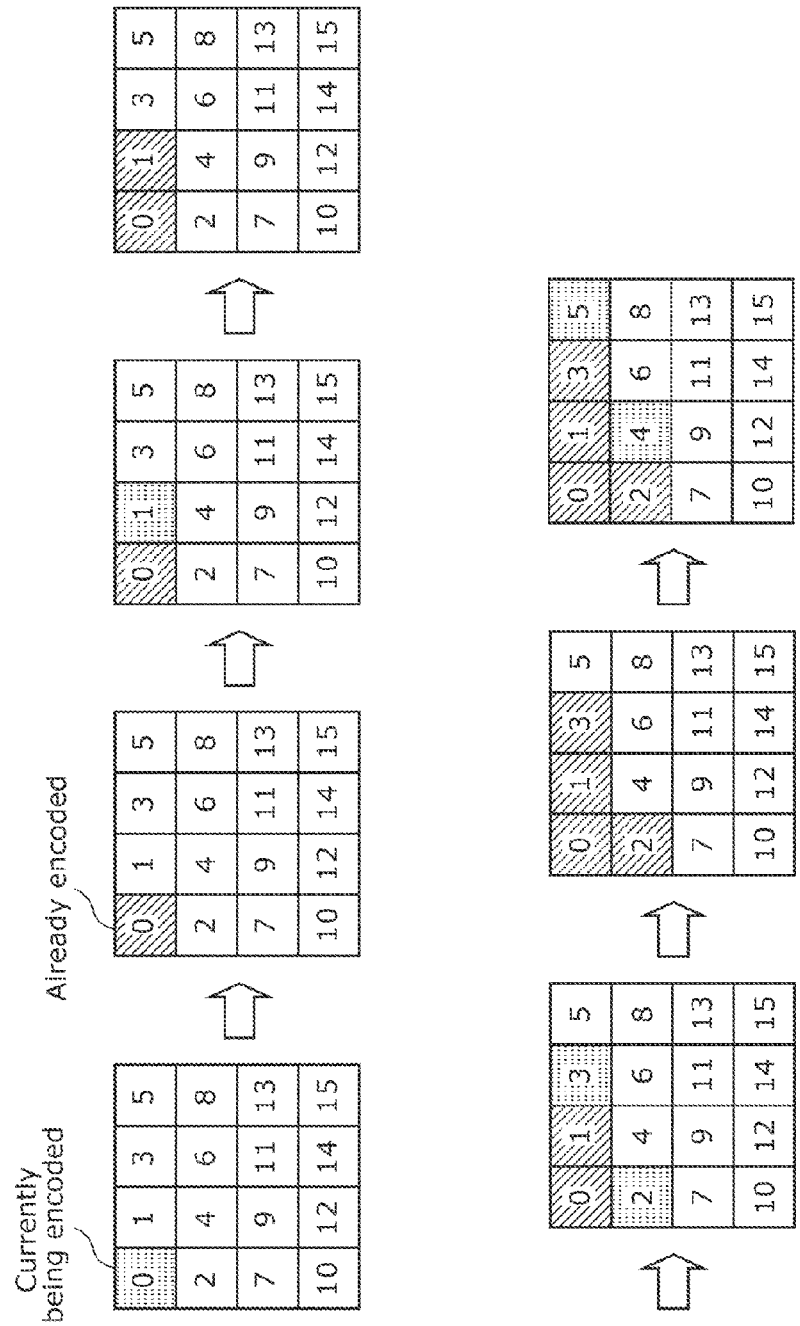
FIG. 10 is a diagram for illustrating parallel processes in intra prediction according to the embodiment.

However, in order to perform processing in the writing order illustrated in FIG. 3, it is difficult to process the plurality of PUs in parallel, and thus it is impossible to accelerate the processing. On the other hand, use of the processing order illustrated in FIG. 5 makes it possible to process the PUs in parallel as illustrated in FIG. 10. The numerals assigned to the respective PUs in FIG. 10 indicate the processing order in FIG. 5 in the embodiment. In the example illustrated in FIG. 10, Block 2 and Block 3 are processed in parallel, and Block 4 and Block 5 are processed in parallel. Although not illustrated, the subsequent blocks can also be processed in parallel.

In this way, the use of the processing order illustrated in FIG. 5 allows the image encoding apparatus 100 according to the embodiment to perform intra prediction at high speed.

As described above, the image encoding apparatus 100 sets a lower-left reference prohibition block, and prohibits reference of a lower-left PU for the lower-left reference prohibition block. In this way, it is possible to prevent a problem from occurring in processing performed in an order different from any order defined by the HEVC standard.

Furthermore, the image encoding apparatus 100 rearranges quantization coefficients generated on a per PU, in an order defined by the HEVC standard. In this way, the image encoding apparatus 100 can generate a code conforming to the HEVC standard.

In this way, the image encoding apparatus 100 modifies the writing order defined by the HEVC standard to a processing order in which parallel processing can be performed. Here, it is allowed to refer to the lower-left block before the modification, but it is prohibited to refer to the lower-left block for the block for which lower-left block cannot be referred to after the modification. In this way, the image encoding apparatus 100 can generate the code conforming to the HEVC standard at high speed.

[Variation]

In FIG. 5, a CU includes 8×8 pixels, and a PU includes 4×4 pixels. Although an example case where four such CUs are adjacent to each other has been described, the size and the number of CUs and the size and the number of PUs are not limited thereto. It is to be noted that the processing order in which at least one target CU includes 4×4 number of PUs each having an equal size is the same as in FIG. 5. Such a case where at least one target CU includes 4×4 PUs each having an equal size is, for example, (i) a case where a CU includes 8×8 pixels, a PU includes 8×8 pixels, and four such CUs are adjacent to each other, or (ii) a case where a CU includes 16×16 pixels, a PU includes 16×16 pixels, and four such CUs are adjacent to each other.

Figure 11:
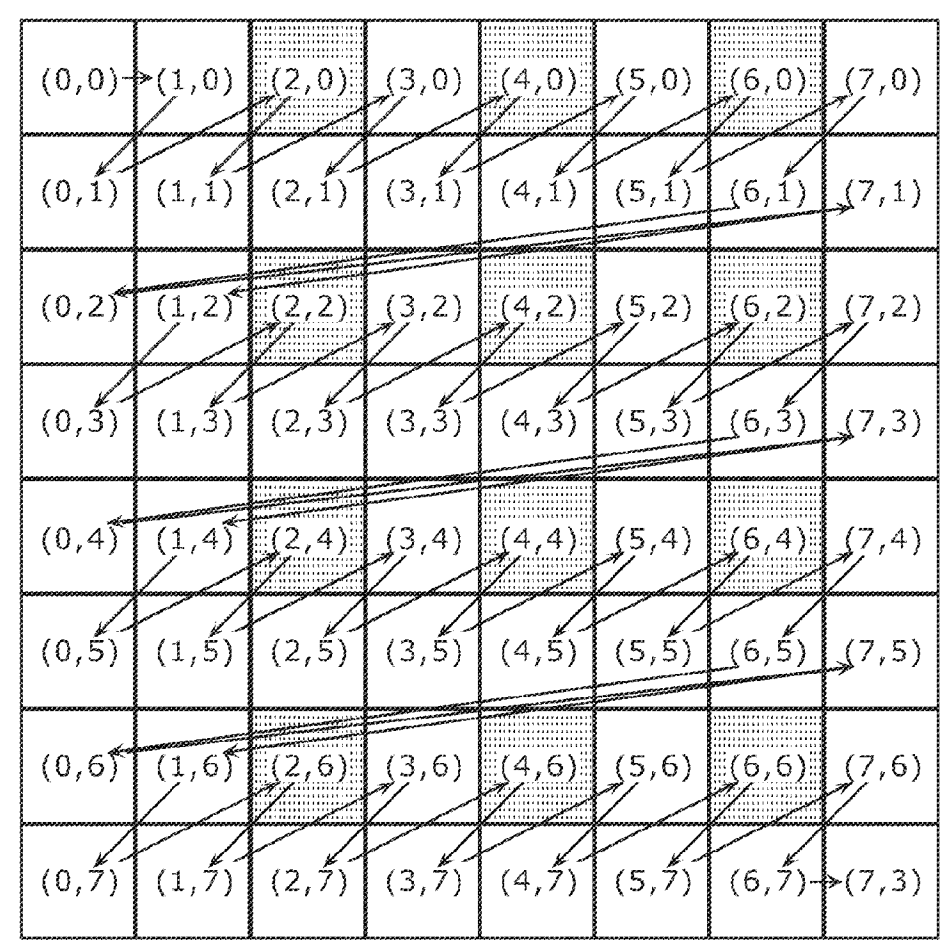

FIG. 11 illustrates a processing order when PUs having an equal size are included in each of four CUs adjacent to each other. Such a case where PUs having an equal size are included in each of four CUs adjacent to each other is, for example, (i) a case where the CU includes 8×8 pixels and a PU includes 4×4 pixels, or (ii) a case where the CU includes 8×8 pixels and a PU includes 8×8 pixels. In the processing order illustrated in FIG. 11, PUs located at (2, 0), (2, 2), (2, 4), (2, 6), (4, 0), (4, 2), (4, 4), (4, 6), (6, 0), (6, 2), (6, 4), and (6, 6) are set as lower-left reference prohibition blocks.

Figure 12:
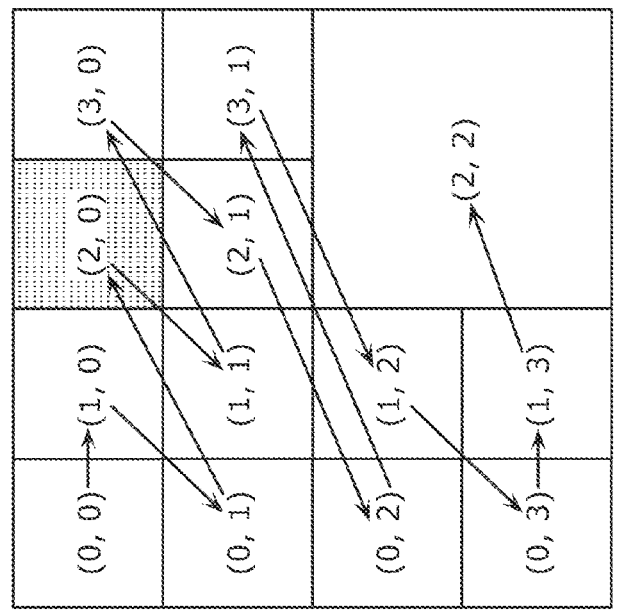
FIG. 12 is a diagram illustrating another example of a processing order in intra prediction according to the embodiment.

As illustrated in FIG. 12, at least one target CU may include PUs having different sizes. Also in this case, the PU which is set as the lower-left reference prohibition block is a PU (i) for which the lower-left PU is referred to in the case of performing processing according to the writing order in the HEVC standard and (ii) which is (located at (2, 0) in FIG. 12 and) processed before the lower-left PU in the processing order in the present disclosure.

Figure 13:
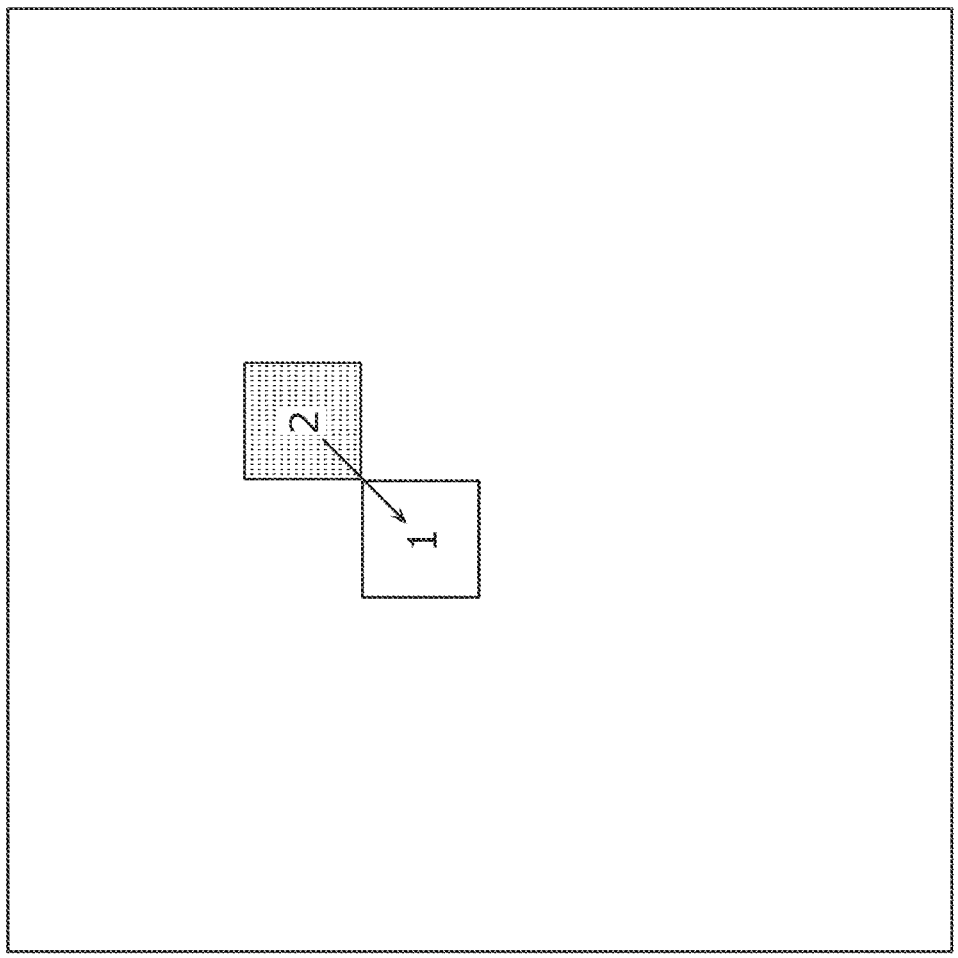
FIG. 13 is a diagram illustrating an outline of a processing order in intra prediction according to the embodiment.

In short, in the present disclosure, the PU (second processing block) that satisfies the following condition as illustrated in FIG. 13 is set as the lower-left reference prohibition block.

(1) A first processing block (PU1 in FIG. 13) that is arbitrary selected and a second processing block (Block 2 in FIG. 13) that is equal in size to the first processing unit and is located upper right of the first processing block are included in at least one target CU that is a processing target.

(2) In the HEVC standard, information on a second processing block (PU2) is written as a bitstream after information on a first processing block (PU1).

(3) In the processing order in the present disclosure, intra prediction is performed on the second processing block (PU2), and subsequently on the first processing block (PU1).

As illustrated in FIG. 14, in addition to the conditions (1) to (3), the PU (second processing block) that satisfies the following conditions may be set as a lower-left reference prohibition block.

(4) A third processing block (PU1 in FIG. 14) that is equal in size to the first processing block (PU3 in FIG. 14) and is located above the first processing block and a fourth processing block (PU2 in FIG. 14) that is equal in size to the first processing block (PU3) and is located left of the first processing block (PU3) are included in at least one target CU that is a processing target.

(5) In the processing order in the present disclosure, intra prediction is performed in the order of the third processing block (PU1), the fourth processing block (PU2), the second processing block (PU4), and the first processing block (PU3).

In FIGS. 13 and 14, the numerals assigned to the respective PUs indicate the processing order in the HEVC standard. In addition, the arrows indicate the processing order in the present disclosure.

The parallel processing illustrated in FIG. 10 is an example, and any parallel processing method is possible. For example, in the example illustrated in FIG. 10, Block 3 and Block 4 may be processed in parallel. In the example illustrated in FIG. 13, among the plurality of processing blocks (PUs), a first processing block group including the first processing block (PU1 in FIG. 13) and a second processing block group including a second processing block (PU2 in FIG. 13) may be processed in parallel.

In addition, when such parallel processing is performed, there is no need that processing of a given PU is completed first and then processing of the next PU is started in the above processing order of PUs. In other words, the above processing order of PUs may be either a processing starting order of the PUs or a processing ending order of the PUs. For example, in the example illustrated in FIG. 10, when processing of Block 3 is started after processing of Block 2 is started, part of processing of Block 2 and Block 3 may be performed at the same time.

Furthermore, in the example illustrated in FIG. 10, processing of Block 2 and Block 3 may be started at the same time, or processing of Block 3 may be started before processing of Block 2. In short, in the above processing order, processing order of PUs may be modified within a range in which parallel processing can be performed.

Although an example using the HEVC standard has been described in the above description, the present disclosure is applicable to an arbitrary image coding standard using an intra prediction mode in which a lower-left processing block (PU) is referred to.

Although the image encoding apparatus 100 includes only the intra prediction unit 108 as a prediction unit to simplify the explanation, the image encoding apparatus 100 may include a functional block for performing inter prediction. FIG. 1 illustrates a case where only intra prediction is simply used as prediction. However, similar processing is applicable to either a case where intra pictures included in an input video including inter pictures are used or a case where at least one target intra CU is included in a current inter picture.

The above embodiment has been explained as an example of a technique in the present disclosure. For this purpose, the attached drawings and detailed descriptions have been provided.

Accordingly, the constituent elements illustrated in the attached drawing and described in the detailed descriptions include not only constituent elements that are essential to solve the problem but also constituent elements that are not essential to solve the problem. For this reason, it should not be directly asserted that the non-essential constituent elements are essential based on the fact that the non-essential constituent elements are illustrated in the attached drawing and are described in the detailed descriptions.

The above embodiment is provided as an example for illustrating the present disclosure, and thus various kinds of modification, replacement, addition, omission, etc. may be made in the scope of the Claims or the equivalent range.

An image encoding method according to the present disclosure includes: dividing each of coding unit blocks (CU) into a plurality of processing blocks (PU) which are processing units for intra prediction, each of the coding unit blocks being obtained by dividing a current picture to be encoded; and selecting, for each of the plurality of processing blocks, one of intra prediction modes specified by a predetermined coding standard, and performing intra prediction according to the selected intra prediction mode, wherein the intra prediction modes include a lower-left reference mode in which a processing block located at lower left of a current processing block to be processed is referred to, the plurality of processing blocks include a first processing block and a second processing block located at upper right of the first processing block, the second processing block being equal in size to the first processing block, the predetermined coding standard defines that information on the second processing block is written into a bitstream after information on the first processing block, and in the intra prediction, (i) selection of the lower-left reference mode is prohibited and intra prediction is performed on the second processing block, and subsequently, (ii) intra prediction is performed on the first processing block.

In this way, the image encoding method allows intra prediction in the order different from the order in the predetermined coding standard. The image encoding method allows fast intra prediction. By prohibiting reference of the lower-left processing block for the second processing block, it is possible to prevent occurrence of a problem due to modification of the processing order.

For example, the image encoding method may further include: generating a residual signal representing a difference between the current processing block and a prediction image generated by intra prediction; performing orthogonal transform and quantization on the residual signal to generate a quantized coefficient; and rearranging a plurality of the quantized coefficients corresponding to the plurality of processing blocks, in an order defined by the coding standard.

In this way, it is possible to generate the code conforming to the coding standard.

For example, in the intra prediction, among the plurality of processing blocks, a first processing block group including the first processing block and a second processing block group including the second processing block may be processed in parallel.

In this way, the image coding method allows parallel processing on the processing blocks, and can thereby accelerate the processing.

For example, the predetermined coding standard may be the high efficiency video coding (HEVC) standard, and a plurality of the lower-left reference modes may include Mode 0 and Mode 2 to Mode 9 in the HEVC standard.

In this way, the image encoding method allows fast processing of the code conforming to the HEVC standard.

For example, the plurality of processing blocks may further include: a third processing block that is equal in size to the first processing block and located above the first processing block; and a fourth processing block that is equal in size to the first processing block and located left of the first processing block, wherein in the intra prediction, the intra prediction may be performed in the following listed order of the third processing block, the fourth processing block, the second processing block, and the first processing block.

For example, the plurality of processing blocks may be arranged in 4 pixels high and 4 pixels wide, when a location of each of the processing blocks is represented as (X, Y){X, Y=0, 1, 2, 3} where X denotes a horizontal axis position and Y denotes a vertical axis position with respect to an upper-left most one of the processing blocks in the coding unit block, the intra prediction may be performed on the processing units in the following listed order: (0, 0), (1, 0), (0, 1), (2, 0), (1, 1), (3, 0), (2, 1), (0, 2), (3, 1), (1, 2), (0, 3), (2, 2), (1, 3), (3, 2), (2, 3), and (3, 3), and the second processing block may include the processing blocks located at (2, 0) and (2, 2).

In this way, the image encoding method allows fast processing of coding unit blocks including 4×4 processing blocks.

These general and specific aspects may be implemented using an apparatus, a system, a method, an integrated circuit, a computer program, or a computer-readable recording medium such as a CD-ROM, or any combination of apparatuses, systems, methods, integrated circuits, computer programs, or computer-readable recording media.

Each of the constituent elements in the above-described embodiment may be configured in the form of an exclusive hardware product, or may be realized by executing a software program suitable for the constituent element. Each of the constituent elements may be realized by means of a program executing unit, such as a CPU and a processor, reading and executing the software program recorded on a recording medium such as a hard disk or a semiconductor memory.

In addition, all of the numerals above are used for the purpose of specifically explaining the present disclosure, and thus the present disclosure is not limited to the exemplary numerals.

In addition, functional blocks in the block diagram are divided as an example. Thus, some of the functional blocks may be integrated into a single functional block, a single functional block may be divided into a plurality of functional blocks, or part of functions of a functional block may be transferred to another one of the functional blocks. Furthermore, similar functions of some of the functional blocks may be processed by hardware or software in parallel or in time division.

In addition, the execution order of a plurality of steps illustrated in the flowchart is provided for the purpose of specifically explaining the present disclosure, and thus other execution orders are possible. Some of the steps may be executed at the same time (in parallel) with any of the other steps.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable to an image encoding method and an image decoding apparatus. More specifically, the present disclosure is applicable to recorders, digital cameras, tablet terminals, etc.

The invention claimed is:

1. An image encoding method for encoding a picture based on a coding standard, comprising:
    dividing, using a processor, a current picture into a plurality of processing blocks which are processing units for intra prediction; and
    selecting, using the processor, for each of the plurality of processing blocks, one of a plurality of intra prediction modes, and performing intra prediction according to the selected intra prediction mode,
    wherein, in the coding standard, an intra prediction mode for a processing block at a predetermined fixed position can be one of a DC prediction mode, a Planar prediction mode, a first reference mode in which a processing block located at a lower left of a current processing block to be processed is referred to, or a second reference mode in which a processing block located left of, above, or upper-right of, a current processing block to be processed is referred to, and
    wherein in the selecting, an intra prediction mode for a processing block at the predetermined fixed position is selected from only the DC prediction mode, the Planar prediction mode, or the second reference mode.

2. The image encoding method according to claim 1, further comprising:
    generating a residual signal representing a difference between the current processing block and a prediction image generated by intra prediction;
    performing orthogonal transform and quantization on the residual signal to generate a quantized coefficient; and
    rearranging a plurality of the quantized coefficients corresponding to the plurality of processing blocks, in an order defined by the coding standard.

3. The image encoding method according to claim 1, wherein in the intra prediction,
    among the plurality of processing blocks, a first processing block group including a first processing block and a second processing block group including a second processing block are processed in parallel.

4. The image encoding method according to claim 1, wherein the coding standard is the high efficiency video coding (HEVC) standard, and a plurality of the lower-left reference modes include Mode 0 and Mode 2 to Mode 9 in the HEVC standard.

5. The image encoding method according to claim 1, wherein the plurality of processing blocks further include:
a third processing block that is equal in size to a first processing block and located above the first processing block; and
a fourth processing block that is equal in size to the first processing block and located left of the first processing block,
wherein in the intra prediction, the intra prediction is performed in the following listed order of the third processing block, the fourth processing block, a second processing block, and the first processing block.

6. The image encoding method according to claim 5, wherein the plurality of processing blocks are 4×4 number of processing blocks each having an equal size,
when a location of each of the processing blocks is represented as $(X, Y)\{X, Y=0, 1, 2, 3\}$ where X denotes a horizontal axis position and Y denotes a vertical axis position with respect to an upper-left most one of the processing blocks in a coding unit block, the intra prediction is performed on the processing units in the following listed order: (0, 0), (1, 0), (0, 1), (2, 0), (1, 1), (3, 0), (2, 1), (0, 2), (3, 1), (1, 2), (0, 3), (2, 2), (1, 3), (3, 2), (2, 3), and (3, 3), and
the second processing block comprises the processing blocks located at (2, 0) and (2, 2).

7. An image encoding apparatus for encoding a picture based on a coding standard, comprising:
a memory storing a program; and
a processor coupled to the memory and configured to execute the program so as to:
divide a current picture into a plurality of processing blocks which are processing units for intra prediction; and
select, for each of the plurality of processing blocks, one of a plurality of intra prediction modes and performing intra prediction according to the selected intra prediction mode,
wherein, in the coding standard, an intra prediction mode for a processing block at a predetermined fixed position can be one of a DC prediction mode, a Planar prediction mode, a first reference mode in which a processing block located at a lower left of a current processing block to be processed is referred to, or a second reference mode in which a processing block located left of, above, or upper-right of, a current processing block to be processed is referred to, and
wherein an intra prediction mode for a processing block at the predetermined fixed position is selected from only the DC prediction mode, the Planar prediction mode, or the second reference mode.

* * * * *